(12) United States Patent
Jungmaier et al.

(10) Patent No.: US 11,550,046 B2
(45) Date of Patent: Jan. 10, 2023

(54) SYSTEM AND METHOD FOR A VOICE-CONTROLLABLE APPARATUS

(71) Applicant: Infineon Technologies AG, Neubiberg (DE)

(72) Inventors: Reinhard-Wolfgang Jungmaier, Alkoven (AT); Ashutosh Baheti, Munich (DE); Jagjit Singh Bal, Fremont, CA (US); Thomas Gmeinder, Schondorf (DE); Henk Muller, Bristol (GB); Shyam Nallabolu, Fremont, CA (US); Dennis Noppeney, Cologne (DE); Avik Santra, Munich (DE); Raghavendran Vagarappan Ulaganathan, Munich (DE)

(73) Assignee: Infineon Technologies AG, Neubiberg (DE)

( * ) Notice: Subject to any disclaimer, the term of this patent is extended or adjusted under 35 U.S.C. 154(b) by 956 days.

(21) Appl. No.: 16/284,626

(22) Filed: Feb. 25, 2019

(65) Prior Publication Data
US 2019/0265345 A1 Aug. 29, 2019

Related U.S. Application Data

(60) Provisional application No. 62/635,150, filed on Feb. 26, 2018.

(51) Int. Cl.
| | |
|---|---|
| *G01S 13/04* | (2006.01) |
| *G01S 13/08* | (2006.01) |
| *G01S 13/56* | (2006.01) |
| *G01S 13/86* | (2006.01) |
| *H04R 1/34* | (2006.01) |
| *H04R 1/40* | (2006.01) |
| *H04R 3/00* | (2006.01) |
| *H04S 7/00* | (2006.01) |
| *G01S 13/00* | (2006.01) |

(52) U.S. Cl.
CPC ............ *G01S 13/04* (2013.01); *G01S 13/08* (2013.01); *G01S 13/56* (2013.01); *G01S 13/86* (2013.01); *H04R 1/342* (2013.01); *H04R 1/406* (2013.01); *H04R 3/005* (2013.01); *H04S 7/303* (2013.01)

(58) Field of Classification Search
CPC .................................................... G01S 3/8083
See application file for complete search history.

(56) References Cited

U.S. PATENT DOCUMENTS

| | | | | | |
|---|---|---|---|---|---|
| 3,634,008 | A | * | 1/1972 | Plummer | H04N 5/23258 |
| | | | | | 355/56 |
| 3,844,175 | A | * | 10/1974 | Hixson | G01S 13/86 |
| | | | | | 73/647 |

(Continued)

FOREIGN PATENT DOCUMENTS

| | | | | | |
|---|---|---|---|---|---|
| GB | | 2528154 A | * | 1/2016 | ............ H04R 3/005 |
| WO | WO2011/040816 A1 | | * | 4/2011 | ............ G01S 13/56 |

*Primary Examiner* — Bernarr E Gregory
(74) *Attorney, Agent, or Firm* — Slater Matsil, LLP

(57) ABSTRACT

In accordance with an embodiment, an apparatus includes a millimeter wave radar sensor system configured to detect a location of a body of a person, where the detected location of the body of the person defines a direction of the person relative to the apparatus; and a microphone system configured to generate at least one audio beam as a function at least of the direction.

29 Claims, 10 Drawing Sheets

(56) References Cited

U.S. PATENT DOCUMENTS

| | | | | |
|---|---|---|---|---|
| 4,635,058 | A * | 1/1987 | Sutphin, Jr. | G01S 13/86 |
| | | | | 342/52 |
| 5,075,680 | A * | 12/1991 | Dabbs | G01S 13/86 |
| | | | | 342/36 |
| 5,189,425 | A * | 2/1993 | Dabbs | H01Q 5/45 |
| | | | | 343/781 CA |
| 9,488,442 | B2 * | 11/2016 | Varga | G01S 3/8083 |
| 2013/0307934 | A1 * | 11/2013 | Densham | H04N 13/204 |
| | | | | 348/46 |
| 2015/0009324 | A1 * | 1/2015 | Lee | G08B 13/19695 |
| | | | | 348/143 |
| 2016/0125713 | A1 * | 5/2016 | Blech | G08B 13/187 |
| | | | | 348/143 |
| 2017/0097413 | A1 * | 4/2017 | Gillian | G01S 13/56 |
| 2017/0188138 | A1 * | 6/2017 | Makinen | H04R 3/005 |

\* cited by examiner

SYSTEM AND METHOD FOR A VOICE-CONTROLLABLE APPARATUS

This application claims the benefit of U.S. Provisional Application No. 62/635,150, filed on Feb. 26, 2018, which application is hereby incorporated herein by reference in its entirety.

TECHNICAL FIELD

The present invention relates generally to audio systems, and, in particular embodiments, to a system and method for a voice-controllable apparatus.

BACKGROUND

Voice controlled electronic systems are becoming increasingly more common in smart-phone applications and Internet connected devices. During operation, such systems listen to voice commands issued by a user and perform actions in response to such commands. For example, a voice activated system may play music, provide a verbal weather forecast adjust a thermostat setting or lighting in response to the user's vocal request. Such systems may be deployed to provide control of electronic equipment a smart home.

Ensuring accurate detection of vocal commands designed to trigger a specific response can be challenging given the extremely varied spatial configurations of their surroundings. For example, noisy environments, such as a large crowded room with many people speaking at once may pose difficulties in detecting a user's verbal command.

SUMMARY

In accordance with an embodiment, an apparatus includes a millimeter wave radar sensor system configured to detect a location of a body of a person, where the detected location of the body of the person defines a direction of the person relative to the apparatus; and a microphone system configured to generate at least one audio beam as a function at least of the direction.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

Figure 1:
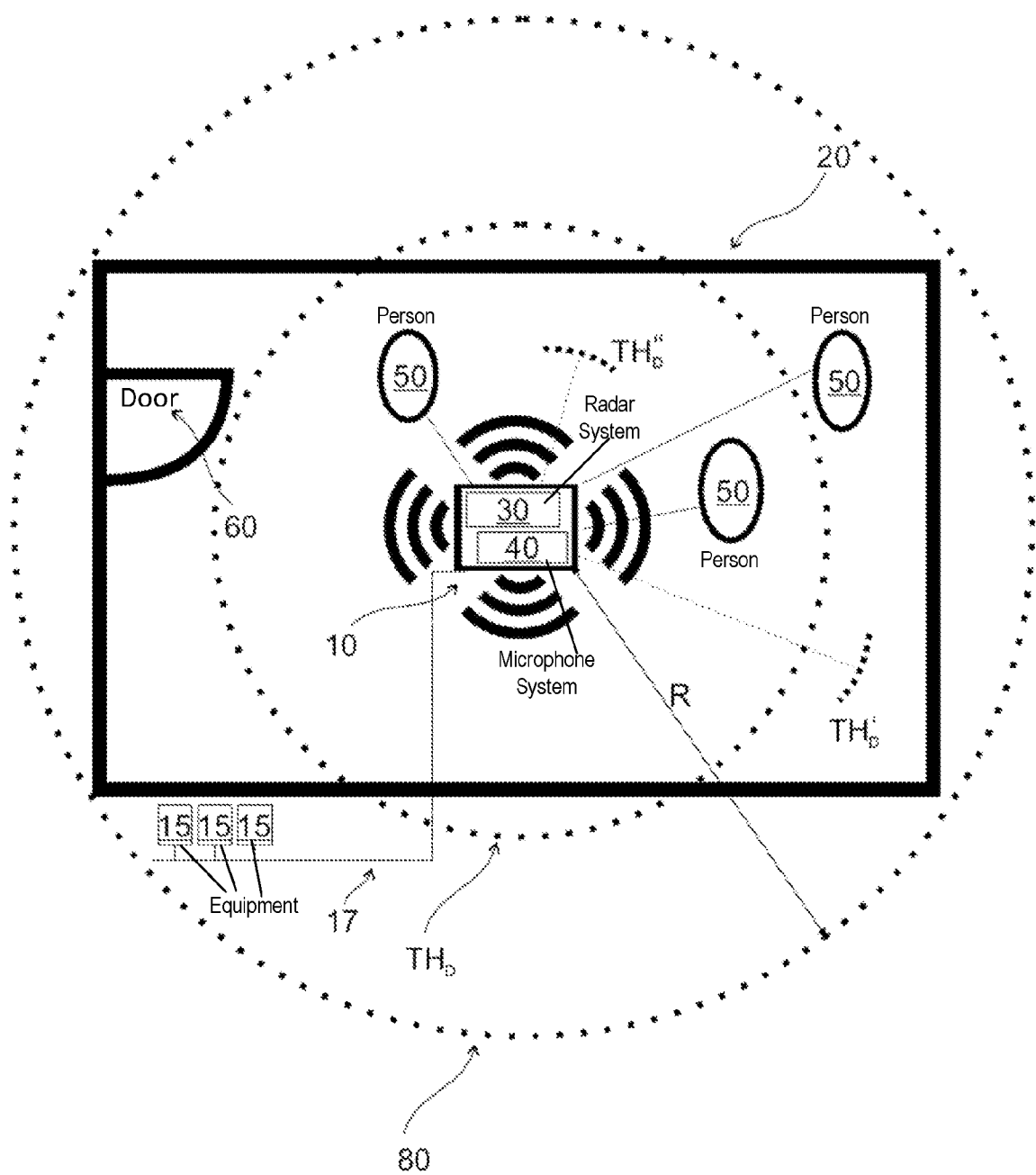
FIG. 1 is an illustration of an apparatus according to an embodiment placed within a given facility.

FIG. 1 illustrates an apparatus 10 according to an embodiment, placed in a facility 20.

The facility 20 may for example be a room, for instance in a home. For instance, the facility 20 or its vicinity, e.g. the home in question, includes pieces of equipment 15 adapted to be remotely controlled, for instance by the apparatus 10 or another piece of equipment operatively coupled thereto. To this end, for instance, the apparatus 10 and the pieces of equipment 15 are connected to a network 17, such as a home network.

The facility 20 further includes one or more access point defined by one or more doors 60.

The apparatus 10 is configured to receive and detect commands issued by persons 50 located in the facility 20, for instance with a view of remotely controlling the pieces of equipment 15, e.g. to turn them on or off, vary one or more parameter of their operations, etc. In the context of an embodiment, the ensemble of possible commands to which the apparatus 10 is configured to react includes vocal commands, i.e. spoken commands. Optionally, this ensemble of commands includes gestures, such as hand gestures, face gestures, arms gestures and so on.

Figure 2:
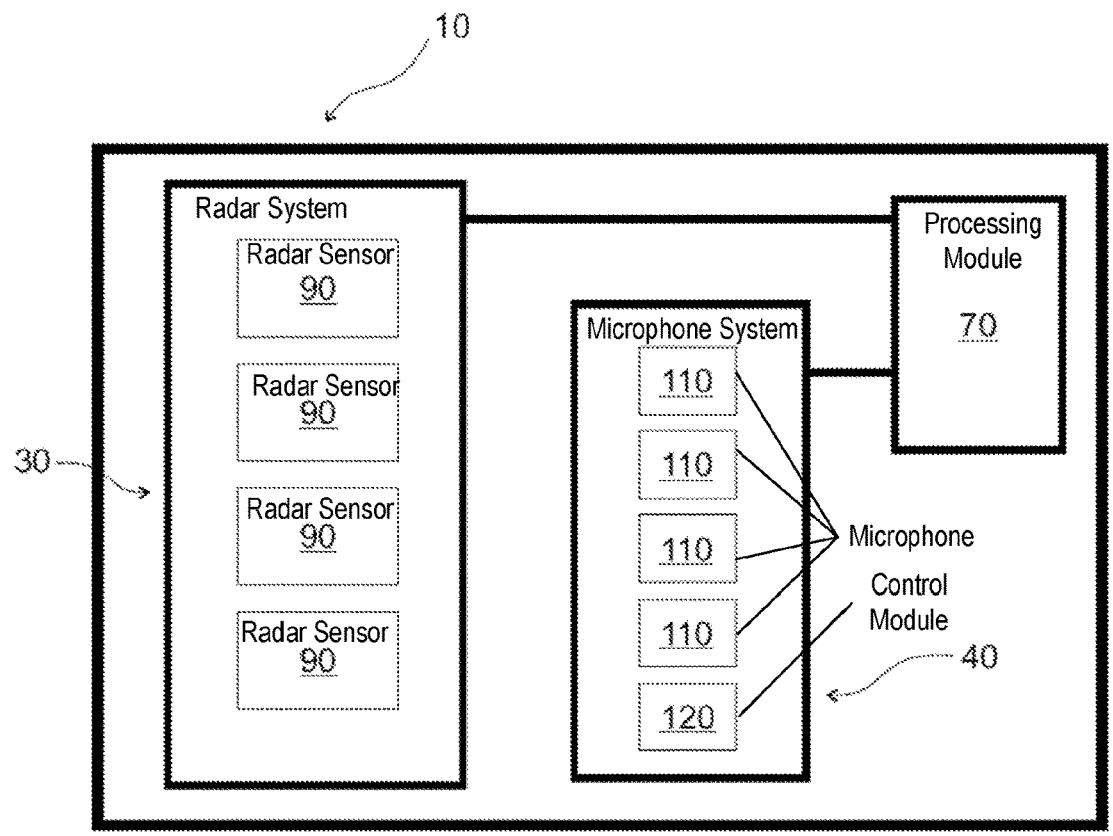
FIG. 2 is an illustration of the apparatus of FIG. 1.

In reference to FIGS. 1 and 2, the apparatus 10 includes a millimeter wave radar sensor system 30, or radar system 30, and a microphone system 40, such as a microphone array of plural microphones no. The apparatus 10 further includes a processing module 70. The systems 30, 40 and the processing module 70 are operatively coupled together.

The radar system 30 is configured to detect a person 50 in the vicinity of the apparatus, this detection being configured to provide at least a direction of the person relative to the apparatus 10. For instance, this direction may be defined by an azimuth and an elevation relative to the apparatus 10.

In the context of an embodiment, the radar system 30 is advantageously configured to detect the body of a person 50. In other words, the radar system 30 focuses on the body of the person 50.

In addition or alternatively, the radar system 30 is configured to detect a person regardless of whether the person is performing a predetermined gesture for triggering a predetermined response from the apparatus. In other words, the detection does not depend on whether the person is performing a specific gesture which is to be interpreted as a command by the apparatus, e.g. with a view to command a piece of equipment 15. The specific gesture in question is for instance one of making a specific movement with a body part such as a hand, moving the lips, looking at a specific object or direction, and so on. In this sense, this detection configuration of the apparatus can be seen as passive, i.e. does not rely on intentional actions carried out by the persons to be detected. In various embodiments, this passive detection is accomplished by performing a series of Macro- Doppler and/or Micro-Doppler radar measurements configured to determine whether a particular object is a human being based on detected motion and detected human vital signs.

It should be noted that this detection scheme may be a mode of detection of the apparatus among a plurality of possible different modes, and that the apparatus may be configured for performing a detection based on another mode, either simultaneously in parallel of the detection mode mentioned above, or at a different time. In particular, the radar system 30 may also be configured to detect that a specific gesture forming a command destined to the apparatus is performed by a detected person. In other words, the detection mode is adapted not to prevent the detection of commands issued by persons.

Here, by "detection", it is meant that the radar system 30 is configured to output sensor data which are representative of the detection of the person in the vicinity of the apparatus 10. These data may be raw sensor data, for instance when the processing of the data is made by a piece of equipment external to the radar system 30 as in FIG. 2 such as the processing module 70 included in the apparatus or even by a processing equipment external to the apparatus. Alternatively, these data may be processed data which characterize at least the direction of the person relative to the apparatus, such as in terms of elevation and azimuth, e.g. when the data are processed by the radar system 30 itself.

Advantageously, the radar system 30 is configured to simultaneously detect a plurality of persons, optionally through detecting the location of their body and regardless of whether one or more person is performing a predetermined gesture configured to trigger a predetermined response from the apparatus. Each detected person defines a direction relative to the apparatus which is indicative of the relative direction between the apparatus and the person, e.g. in terms of azimuth and angle.

Advantageously, in the context of an embodiment, the radar system 30 is also configured to detect the distance of the persons 50 relative to the apparatus 10. In other words, in addition to providing directional information between the person and the apparatus 10, it is also adapted to provide distance information between the person and the apparatus 10.

The radar system 30 exhibits a coverage area around the apparatus 10 within which it is adapted to detect a person. The coverage area 80 is delimited radially by a maximum detection range R of the radar system 30. This range R may correspond to the physical limitation of the radar system in terms of coverage. This coverage area 80 may be circular, but may not be. For instance, the maximum detection range R is then defined as the smallest of all the maximum detection ranges the coverage area has, i.e. its minimal radius. Another definition may be adopted, such as the maximum value of the maximum detection ranges, i.e. the maximal radius of the coverage area 80.

This radius is for instance considered based on a projection of the coverage area (which is for instance a volume), for instance on the floor of the facility 20 or in a plane parallel thereto.

In FIG. 1, the coverage area 80 is depicted as having a 360° angular coverage around the apparatus. In other embodiments, the angular coverage is strictly inferior to 360°. In embodiments, the angular coverage is 180°. In embodiments, the angular coverage may be strictly inferior to 180°.

The operating detection frequency (or frequencies) of the radar system 30 is for instance above 20 GHz. For instance, an operating detection frequency of the radar system 30 is 24 GHz. Another possible frequency is 60 GHz. Other frequencies may be used.

The radar system 3o includes a plurality of millimeter wave radar sensor subsystems 90, or subsystems 90. Each of them is configured to cover an angular sector of the angular coverage of the radar system 30, and they jointly cover the entirely angular coverage of the radar system 30. Their respective angular sectors may overlap or not.

Each subsystem 90 is in practice configured, e.g. at least spatially arranged, to cover the corresponding sector.

In at least one embodiment, advantageously, the millimeter wave radar sensor system is adapted to vary the angular coverage dynamically. In other words, regions of space which are covered by the radar system 30 at a given time may not be covered at a different time, all things being equal (in particular the arrangement of the apparatus 10 in space).

To accomplish this, in a configuration, the radar system 30 is adapted to selectively activate and deactivate each millimeter wave radar sensor subsystem.

In another configuration, the apparatus 10 is adapted to selectively include or not include sensor output data respectively generated by each millimeter wave radar sensor subsystem during a processing of sensor output data generated by the millimeter wave radar sensor system.

In a specific embodiment, the apparatus 10 may operate in a standby mode, in which only part of the angular sectors are active. For instance, at least one angular sector which is kept active contains an access point of the facility, such as the door 60. Therefore, the apparatus may keep tracking of meaningful events (somebody entering the room) in a reduced power mode.

In practice, the radar system 30 may turn on or off each angular sector in these embodiments.

In a given embodiment, at least one angular sector may not be adjacent to another angular sector. In other words, the angular coverage of the radar system may not form a connected space.

Figure 3:
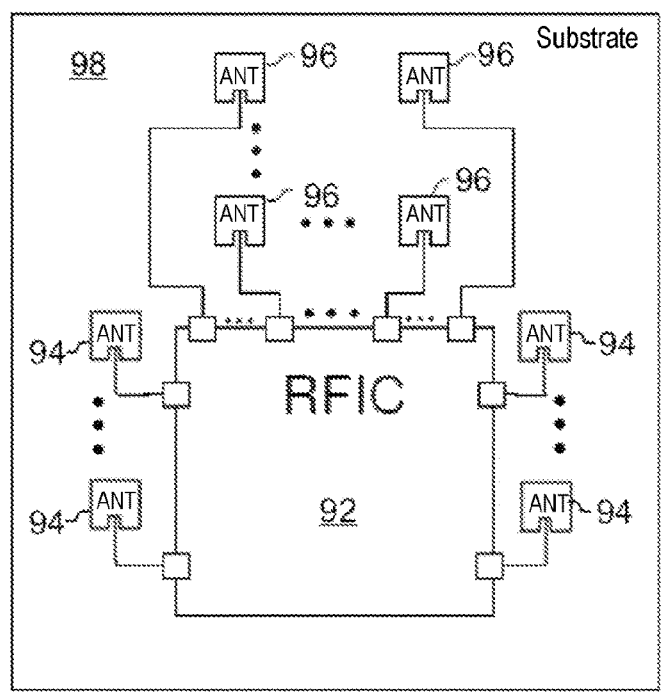
FIG. 3 illustrates a millimeter wave radar sensor subsystem of an apparatus according to an embodiment.

In reference to FIG. 3, each subsystem 90 includes an integrated circuit 92, one or more transmit antennas 94, one or more receive antennas 96, and a substrate 98. In some embodiments, the one or more transmit antennas 94 are arranged in a transmit antenna array, and/or the one or more receive antennas 96 are arranged in a receive antenna array.

The integrated circuit 92 and the antennas 94, 96 are arranged on the substrate 98, whose spatial orientation is chosen (as a function of the elements of subsystem that is) so that the subsystem 90 covers the chosen angular sector.

In some embodiments, at least two subsystems 90 share an integrated circuit chip 92, a substrate 98, or both. In some embodiments, the radar system 30 includes a single substrate for all the subsystems 90.

The integrated circuit chips 92 are for instance radio frequency integrated circuit (RFIC) chips.

It should be noted that the radar subsystems 90 may be implemented as a plurality of antenna elements formed on one or more substrate with integrated circuit chips coupled to the planar antenna elements. In other embodiments, the radar subsystems may each include antenna elements and RF circuitry in a single package that is subsequently attached to the planar surface of the substrate 210.

Moreover, various configurations are possible in terms of number of transmit and receive antennas for each subsystem 90 as shown in FIGS. 4 to 8. On these figures, the angular sectors are referred to by the expression "zones" A to D.

Figure 4:
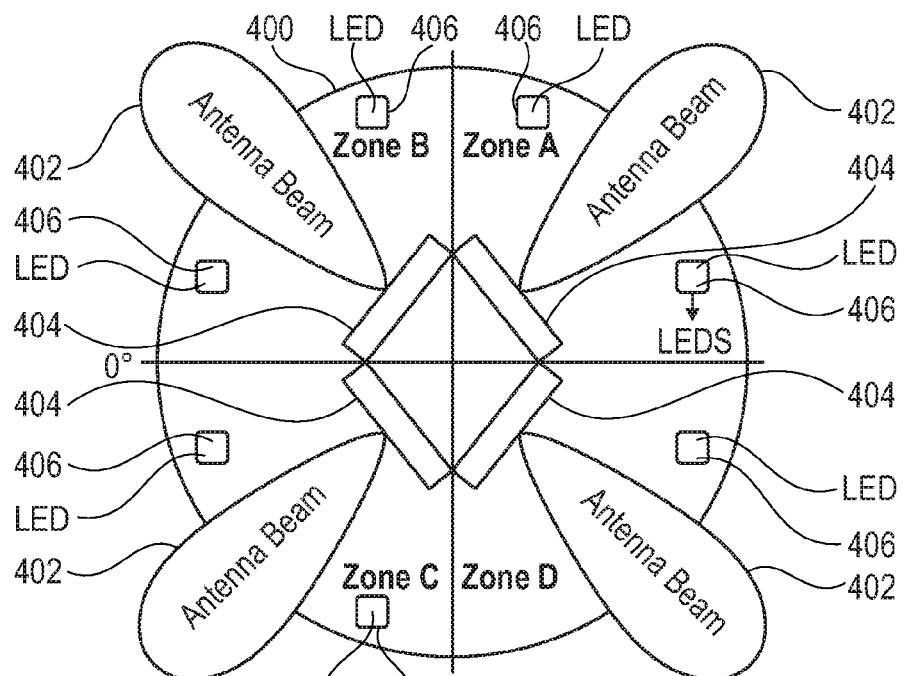
FIGS. 4 to 8 illustrate various configurations of the millimeter wave sensor system of an apparatus according to an embodiment.
Figure 5:
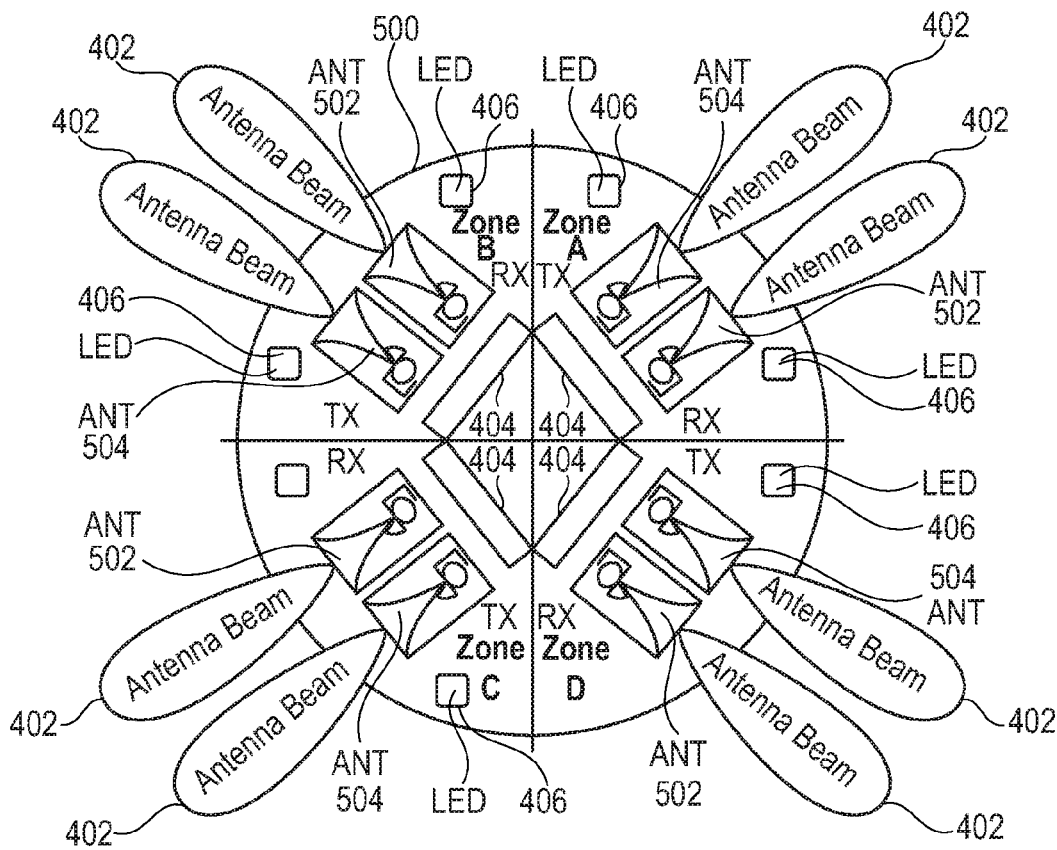
Figure 6:
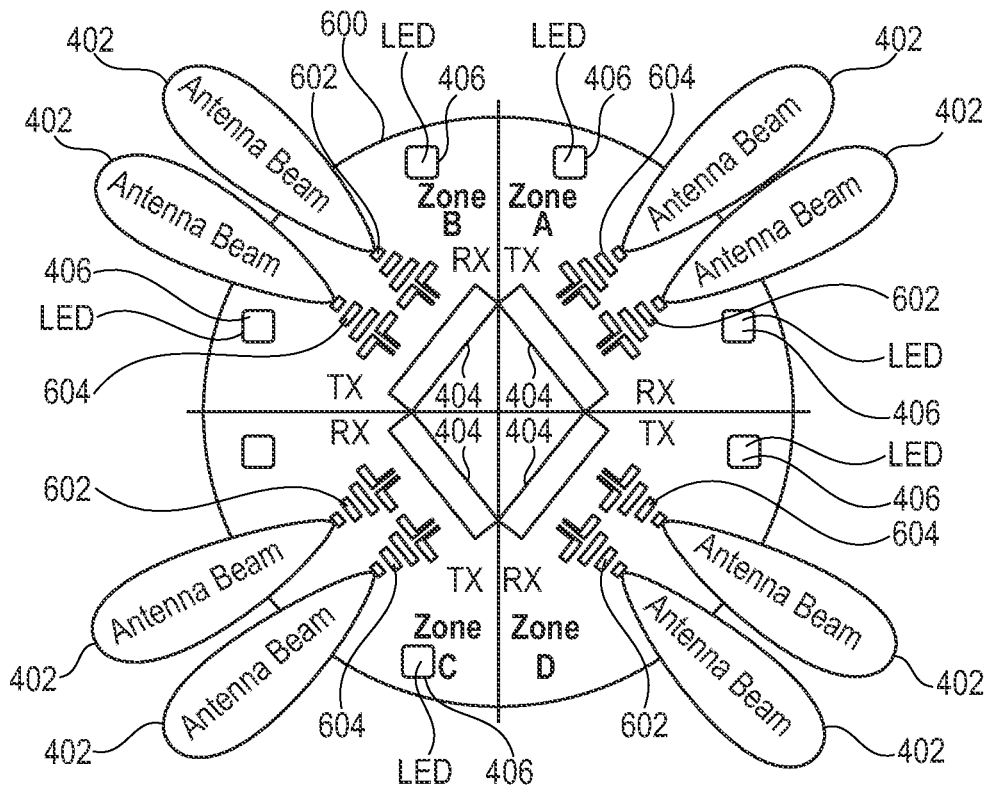

In FIGS. 4 to 6, each subsystem has its own substrate and integrated circuit chip, and has one receive antenna and one transmit antenna. FIG. 4 illustrates millimeter wave sensor system 400 according to an embodiment. As shown, each of zones A, B, C and D include an integrated circuit chip 404 that is configured to produce a respective antenna beam 402 via at least one antenna (not shown). In some embodiments, millimeter wave sensor system 400 includes LEDs 406 that are configured to be illuminated when the presence of a person is detected by the system. For example, the LEDs in zone A may become illuminated in when a person is detected in zone A, and may be turned-off when a person is not detected in zone A.

FIG. 5 illustrates millimeter wave sensor system 500 according to a further embodiment. Millimeter wave sensor system 500 is similar to millimeter wave sensor system 400 shown in FIG. 4 with the addition of a receive antenna 502 and a transmit antenna 504 for each integrated circuit 404 in each zone A, B, C and D. Antennas 502 and 504 are of a type known as Vivaldi.

Figure 7:
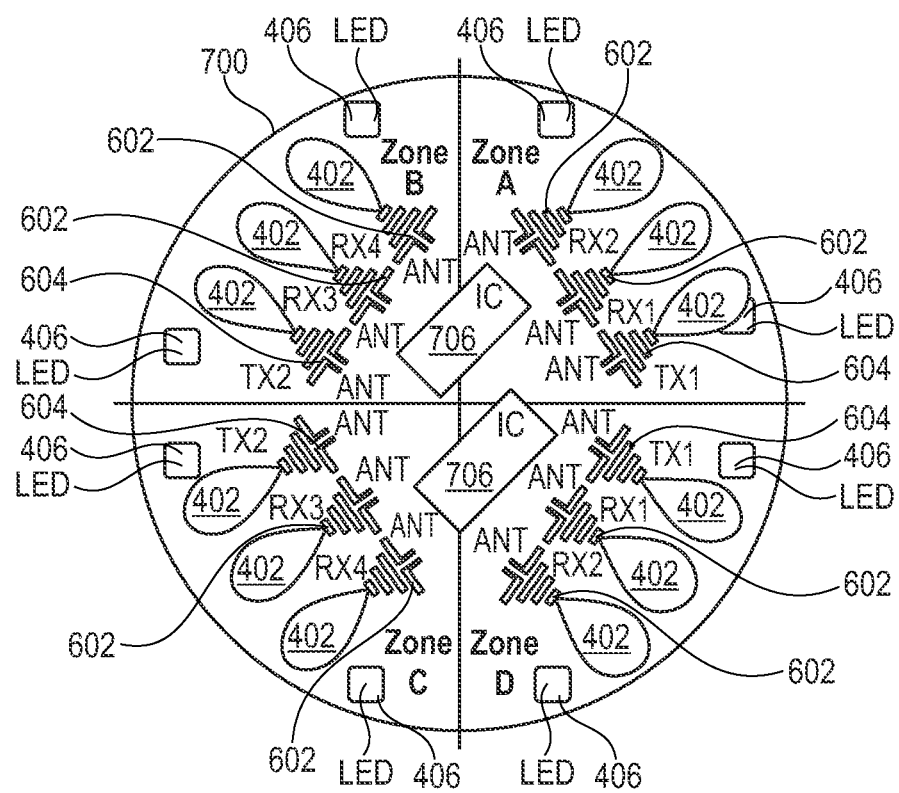
Figure 8:
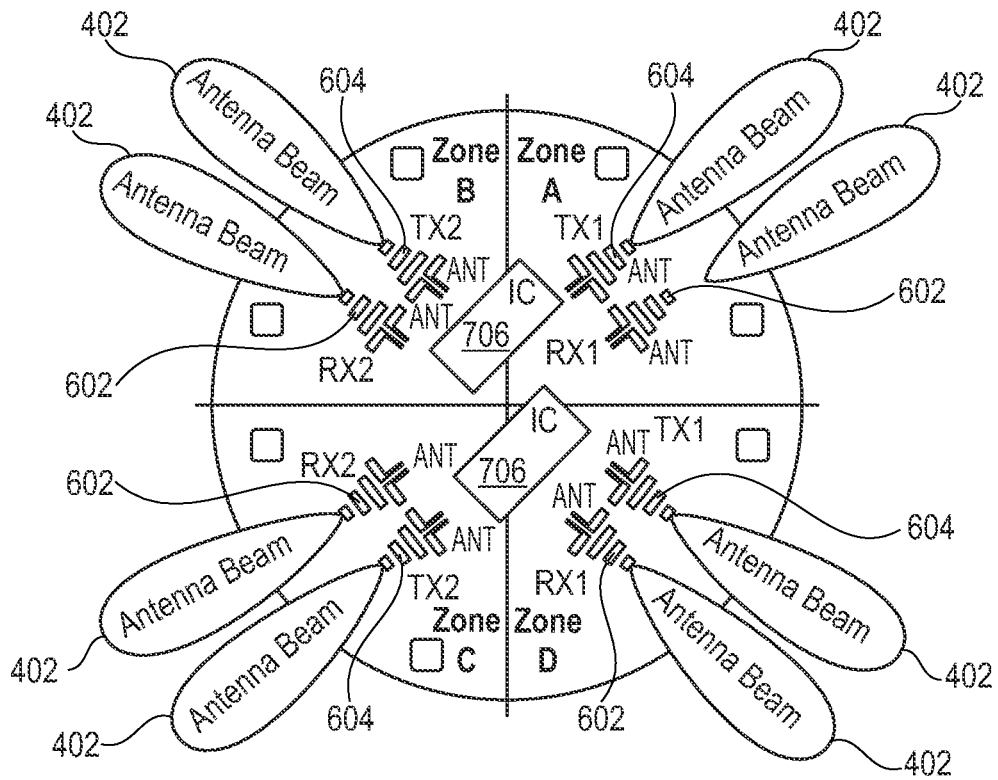

In FIGS. 6 to 8, the antennas are of a type known as Yagi-Uda and are configured to radiate in an end-fire direction parallel to the plane of the antenna. FIG. 6 illustrates millimeter wave sensor system 600 that includes a receive antenna 602 of the Yagi-Uda type and a transmit antenna 604 of the Yagi-Uda type corresponding to each integrated circuit 404 in zones A, B, C and D. Each antenna 602 and 604 has a corresponding antenna beam 402.

FIG. 7 illustrates millimeter wave sensor system 700 that includes two receive antenna 602 of the Yagi-Uda type and one transmit antenna 604 of the Yagi-Uda type for each zone A, B, C and D. As shown, the antennas 602 and 604 of zones A and B share a single integrated circuit chip 706, and the antennas 602 and 604 of zones C and D share a single integrated circuit chip 706.

FIG. 8 illustrates millimeter wave sensor system 800 that includes one receive antenna 602 of the Yagi-Uda type and one transmit antenna 604 of the Yagi-Uda type for each zone A, B, C and D. As shown, the antennas 602 and 604 of zones A and B share a single integrated circuit chip 706, and the antennas 602 and 604 of zones C and D share a single integrated circuit chip 706.

It should be appreciated that the millimeter wave sensor systems depicted in FIGS. 4-8 are just a few examples of many possible embodiment millimeter wave sensor systems. In alternative embodiments, the millimeter wave sensor system may have greater or fewer than four sectors, may have different numbers of transmit and receive antennas, and may have other types of transmit and receive antennas beside Vivaldi and Yagi-Uda antennas, such as patch antennas.

Advantageously, the radar system includes a Frequency-Modulated Continuous Wave radar sensor, or FMCW radar sensor. A given subsystem may form such a sensor. For instance, in some embodiments, each subsystem is FMCW-based.

In practice, a subsystem may be FMCW-based at least given the configuration of its integrated circuit chip.

When such a FMCW sensor is present, advantageously, the apparatus is configured to implement both a Macro-Doppler Filtering operation to sensor data generated by the FMCW radar sensor, whereby movements of the person are detected, and a Micro-Doppler Sensing operation to the sensor data generated by the FMCW radar sensor, whereby vital signs of the person are identified. Here, FMCW is presented merely as a possible modulation scheme for the radar sensor allowing the aforementioned detection scheme. Other modulation schemes may be employed such as a pulsed radar or a code modulated scheme which are publically known modulation schemes for millimeter wave radar sensors.

In some embodiments, the apparatus includes at least one Doppler radar sensor or a radar system configured to perform Doppler measurements. A given subsystem may form such a sensor. For instance, in some embodiments, each subsystem defines such a Doppler sensor.

When a Doppler radar sensor is present, the apparatus 10 is advantageously configured to implement a processing operation to sensor data generated by said Doppler radar sensor, whereby movements of the body of the person are thus detected.

Figure 9A:
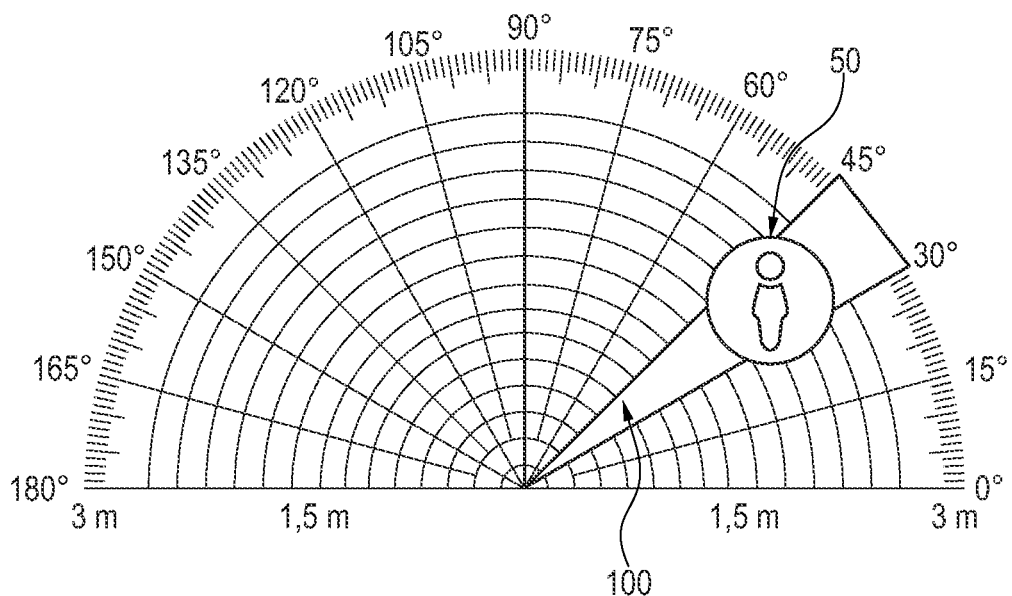
FIG. 9A illustrates an audio beam generated in the context of an embodiment so as to capture audio input.

Still in reference to FIGS. 1 and 2 and in further reference to FIG. 9A, the microphone system 40 is configured to generate one or more audio beam 100 (FIG. 9A) via each of which the microphone system is configured to receive audio inputs. These audio inputs are adapted to include the vocal commands mentioned above, and in general correspond to any sound which may be produced in the vicinity of the apparatus 10.

In addition, the microphone system 40 is configured, for one or more person 50, to generate at least one audio beam associated to the person 50 as a function at least of the direction of the person provided by the radar system 30 so as to enhance the detection and reception of audio inputs generated by the corresponding person by the apparatus 10. Here, "generate an audio beam" is intended to mean providing a reception direction for the microphone system along which the sensitivity of the microphone system is increased.

In other words, as a function at least of the direction of the persons determined based on the radar system 30, the microphone system 40 steers one (or more) audio beam 100 in the corresponding direction so as to enhance the reception of the audio inputs generated by the person, and therefore of the vocal commands this person may issue to the apparatus 10.

For instance, typically, this takes the form of the direction of the main lobe of an audio beam being aligned with the direction of the person as detected by the radar system 30. This steering of the audio beams 100 is for instance done through a known process. For instance, this is achieved through processing the audio inputs of the microphones no through forming a combination of these audio inputs chosen to include respective coefficients for these inputs that are dynamically adjusted based on the direction of the corresponding person as provided by the radar system 30. In other words, during the processing of the inputs provided by the microphone system, a respective weight of the audio inputs provided by each microphone is dynamically adjusted so as to steer the sensitivity of the microphone system in the detected direction.

Advantageously, this is the case for each person as detected by the radar system 30, i.e. at least one audio beam 100 (typically one for instance) will be generated for each person as a function of the corresponding direction so as to enhance the detection of the audio inputs generated by the corresponding person.

Enhancing the detection of the audio inputs may further include increasing the signal to noise ratio. To this end, for instance, a noise cancellation process of the audio inputs received via the audio beam 100 may be performed based on the audio inputs received by the audio beam and audio inputs received by another beam not defined as a function of the direction of the person, and which will therefore pickup background noise relative to the considered person.

Advantageously, the audio beam is adjusted over time based on the changes of the direction of the person relative to the apparatus as detected by the radar system 30. In other words, the audio beam tracks the person as the latter moves in space.

Advantageously, the microphone system 40 is configured to generate an audio beam associated to a person also as a function of the distance of the person 50 relative to the apparatus as captured by the radar system 30.

For instance, the beamwidth of the main lobe of the corresponding beam is adjusted by the microphone system 40 based on the distance of the person 50 relative to the apparatus 10. This is for instance done through a known process. Additionally and independently of the beamwidth, the sensitivity of the microphones may be adjusted according to the detected distance, i.e. the range of the audio beam may be varied accordingly. In the context of the later described beamforming techniques, this may be realized by determining the employed filters also based on the detected distance.

Figure 9B:
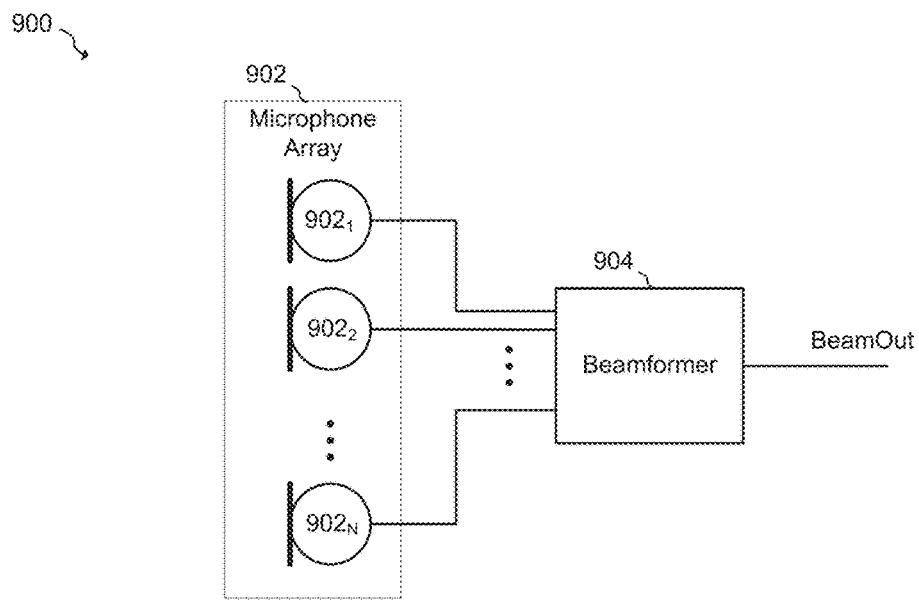
FIG. 9B illustrates a beamforming antenna microphone according to an embodiment.

FIG. 9B illustrates an embodiment beamforming microphone system 900 that can be used, for example, to implement microphone system 40. As shown, beamforming microphone system 900 includes microphone array 902 coupled to a beamformer 904. In various embodiments, microphone array 902 includes a plurality of microphones $901_1$, $901_2$ and $902_N$. While microphone array 902 is shown having three microphones for simplicity of illustration, it should be understood that microphone array 902 can include any number of microphone greater than two. Each microphone $901_1$, $901_2$ and $902_N$ may be implemented using microphone structures known in the art, including, but not limited to a MEMS microphone, a condenser microphone, a condenser electret condenser microphone (ECM), a dynamic microphone. Beamformer 904 receives the output of each microphone $901_1$, $901_2$ and $902_N$, performs beamforming processing on the microphone outputs, and produces a directional audio signal BeamOut that represents an audio signal corresponding to the generated audio beam. Such beamforming processing may be performed, for example, using appropriate analog and/or digital signal processing to produce directional audio signal BeamOut. Beamformer 904 may be implemented using analog signal processing circuitry and/or digital circuitry such as a processor configured to execute digital signal processing algorithms, digital signal processor (DSP), dedicated digital logic, or other circuitry known in the art.

It should be noted that the distance of the person relative to the apparatus may be taken into account in any detection mode of the radar system, whether the one mentioned above, or one in which the detection of the person is carried out e.g. when a specific gesture has been made by the person.

In an embodiment, the microphone system 40 will steer an audio beam towards the detected person 50 only if the distance of the person relative to the apparatus satisfies a predetermine criterion relative to a predetermined threshold distance $TH_D$ chosen strictly inferior to the maximum detection range R.

In an embodiment, the microphone system 40 is configured to generate the audio beam for a person 50 as a function of at least the direction of the person relative to the apparatus only if the detected distance of the person 50 relative to the apparatus 10 is inferior or equal to the predetermine threshold distance $TH_D$.

In other words, a specific condition pertaining to whether the person is close enough to the apparatus 10 in the sense of a threshold chosen to define a portion of the coverage area strictly smaller than the coverage area is scrutinized to determine whether or not an audio beam is steered in the direction of the person.

Therefore, if a person is detected in the inner circle defined by the threshold $TH_D$, an audio beam will be steered in his/her direction. If he or she is detected but is in the outer ring defined between the distance R and the distance $TH_D$, no audio beam is then steered in his/her direction.

The threshold distance $TH_D$ is for instance chosen greater or equal than 10% of the distance R, 30%, or even 50%. For instance, it is comprised between 25% and 75% of the distance R.

In an embodiment, the microphone system 40 is configured to generate the audio beam for a person 50 as a function of at least the direction of the person relative to the apparatus only if the detected distance of the person 50 relative to the apparatus 10 is greater than or equal to a predetermined threshold distance $TH_D$.

In other words, a specific condition pertaining to whether the person is far enough from the apparatus 10 in the sense of a threshold chosen to define a portion of the coverage area strictly smaller than the coverage area is scrutinized to determine whether or not an audio beam is steered in the direction of the person.

Therefore, if a person is detected in the inner circle defined by the threshold $TH_D$, an audio beam will not be steered in his/her direction. If he or she is detected in the outer ring defined between the distance R and the distance $TH_D$, then an audio beam is steered in his/her direction.

In some embodiments, the two conditions above can be selectively activated and deactivated.

In some embodiments, a same apparatus 10 may be configured to apply one or the other condition depending on the chosen operating mode for the apparatus 10.

Although the same reference sign $TH_D$ has been used for describing both conditions, the respective distance values may of course be different in one case and the other.

In an embodiment, the subsystems 90 each have a threshold distance associated thereto, and, for a person detected in the angular sector of a given subsystem, the microphone system 40 will steer an audio beam towards the person only if the distance of the person relative to the apparatus satisfies a predetermine criterion relative to the associated threshold distance.

For instance, it may steer the audio beam only if this distance is greater than the threshold. Alternatively, it may steer the audio beam only if the distance is inferior to the threshold distance.

In an embodiment in which the radar system 30 includes a first and a second subsystems 90 each having a threshold distance $TH_D'$, $TH_D''$ associated thereto, for the first subsystem, the microphone system 40 is configured to generate the audio beam for a person 50 detected in the angular sector of the first subsystem only if the detected distance of the person 50 relative to the apparatus 10 is greater than or equal to the associated predetermined threshold distance $TH_D'$, $TH_D''$; and for the second subsystem, the microphone system 40 is configured to generate the audio beam for a person 50 detected in the angular sector of the second subsystem only if the detected distance of the person 50 relative to the apparatus 10 is smaller than or equal to the associated predetermined threshold distance $TH_D''$, $TH_D'$.

In other words, the triggering effect on the audio beam steering by the microphone system of the relationship between the distance of the person and the threshold distance may differ based on the subsystem.

In an embodiment, to each subsystem 90 may be associated a respective threshold distance. The respective threshold distances $TH_D'$, $TH_D''$ of two subsystems may be different, as illustrated on FIG. 1.

In an embodiment, advantageously, one or more threshold distance of the apparatus 10, e.g. that of the radar system or the respective threshold distances of the subsystems, may be defined to vary. For instance, this variation is implemented based on a usage history of the apparatus.

For instance, the usage history includes data indicative of distances between the apparatus and persons at times at which the corresponding persons issued commands to the apparatus, e.g. vocal commands.

In other words, these data represent distances between the apparatus and persons at times at which these persons issued commands for the apparatus.

For instance, whether the usage history only includes these data for vocal commands, or only the data of the usage history that refer to vocal commands are taken into account.

Any operation or set of operations may be applied to the data to determine the threshold distance(s), such as an averaging step, a sampling step, a transformation step, etc.

For a given subsystem, only the data of the usage history referring to commands issued from positions within the corresponding angular sector may be taken into account.

In reference to FIG. 2, the microphone system 40 includes a plurality of microphones no which are each adapted to form at least one steerable audio beam 100 to receive audio inputs.

The audio beams may be mechanically steerable, electronically steerable, or both.

For instance, the microphones no are arranged, e.g. spatially, so as to cover at least the angular coverage of the radar system 30 around the apparatus 10.

Optionally, the microphone system 40 includes a control module 120 configured to cause the steering of the audio beams of the microphones no.

All or part of the functionalities of this control module 120 may be implemented by the processing module 70.

In further reference to FIG. 2, the processing module 70 is configured to handle the operations of the various elements of the apparatus 10 for the normal operations thereof, in particular that of the radar system 30 and of the microphone system 40.

In an advantageous embodiment, the processing module 70 is configured to process the sensor data generated by the radar system 30 or the audio data collected by the microphone system 40, or both. As indicated above, this processing may be carried out directly by the radar system 30 and/or by the microphone system 40.

In some embodiments, the processing module 70 may be external to the apparatus 10 and may be operatively coupled to the apparatus for carrying out operations remotely, such as processing of data.

In general, various configurations in terms of distribution of the processing module 70 between the radar system 30 and the microphone system 40 are possible, ranging from a fully distributed configuration wherein all the functionalities pertaining to these systems 30, 40 are implemented directly by them (and therefore each system may include one more processing element) to a centralized configuration wherein all the functionalities that pertain for instance to processing data are implemented by the processing module 70 which is then external to these systems 30, 40 (but may or may not be external to the apparatus 10).

In general, the processing module 70 may include a microprocessor or a microcontroller.

In an embodiment, and as suggested above, the processing module 70 is in particular configured to implement the processing of the sensor data of the radar system 30 and of the audio data generated by the microphone system 40.

As discussed above, the output of the processing of the data of the radar sensor is adapted to include direction information that characterizes a direction of a person detected by the radar system 30 relative to the apparatus 10.

Advantageously, it also includes a distance information indicative of the distance between this person and the apparatus 10.

At least the direction information, and advantageously also the distance information, are then used in input by the microphone system 40 (or the processing module 70) to define the one or more audio beams generated by the microphone array 40 as discussed above. The generation of the audio beams per se may be implemented through any known process. In generating the audio beam, a microphone array is used to form a spatial filter which can extract a signal from a specific direction and reduce the contamination of the signals from other directions, i.e. a source of interest may be selected while minimizing undesired interfering signals which may also be called beamforming. In various embodiments, the microphone array may be implemented using microphone array 902 shown, and the various beamforming algorithms described below may be implemented by beamformer 904 shown in FIG. 9B.

The used beamforming algorithms may for instance concentrate on enhancing the sum of the desired sources while treating all other sources as interfering sources. Therein beamforming may be accomplished by filtering the microphone signals and combining the outputs to extract (by constructive combining) the desired signal and reject (by destructive combining) interfering signals according to their spatial location, i.e. beamforming may separate sources with overlapping frequency content that originate at different spatial locations. Generally the employed beamforming algorithms may include so called deterministic beamforming approaches as well as statistically optimum approaches which may be discriminated by the technique used to estimate the spatial filter weights. Both approaches can be used in the time domain or frequency domain. In time domain beamforming, a finite impulse response (FIR) filter is applied to the microphone signal and the filter outputs combined to form the beam, i.e. the beamformer output. In frequency domain beamforming the microphone signal is e.g. separated into narrowband frequency bins using a short time Fourier transform (STFT) and the data in each bin is processed separately. Additionally, the aforementioned deterministic beamforming approaches may also be called data-independent because their filters do not depend on the microphone signals and are chosen to approximate a desired response. Conversely the mentioned statistically optimum beamforming approaches may also be called data-dependent since their filters are designed based on the statistics of the arriving data to optimize a predetermined function that makes the beamformer optimum in a desired sense. For the deterministic beamformer for instance one may wish to receive any signal coming from a certain direction, in which case the desired response may be unity at that direction. As another example, signals from another direction may be treated as interference, in which case the desired response at that direction is zero. One simple deterministic beamformer is publically known as delay and sum beamforming, where the signals at the microphones are delayed and then summed in order to combine the signals arriving from a certain direction of the desired source coherently, expecting that the interference components arriving from off the desired direction cancel to a certain extent by destructive combining. Assuming that the broadband signal can be decomposed into narrowband frequency bins as described above, the delay can be approximated by phase shifts in each frequency band. A more general beamformer is publically known as filter-and-sum beamforming, where, before summation, each microphone signal is filtered with FIR filter of order M (M being the number of microphones in the array). This approach may be preferential of the simpler delay-and-sum algorithm in multipath environments, namely reverberant enclosures. For the statistically optimum beamformers, which may also be used in some embodiments, are designed based on the statistical properties of the desired and interference signals, wherein several criteria can be applied, such as maximum signal to noise ratio (MSNR), minimum mean squared error (MMSE), minimum variance distortionless response (MCDR), and linear constrain minimum variance (LCMV). As a specific example of a MMSE estimate, the multichannel Wiener filter may be mentioned. As another specific system, which is related to an MVDR beamformer, the Generalized Side-lobe Canceller may further be mentioned. Any of the aforementioned and other publically known methods may of course be employed in embodiments of the invention.

Figure 10:
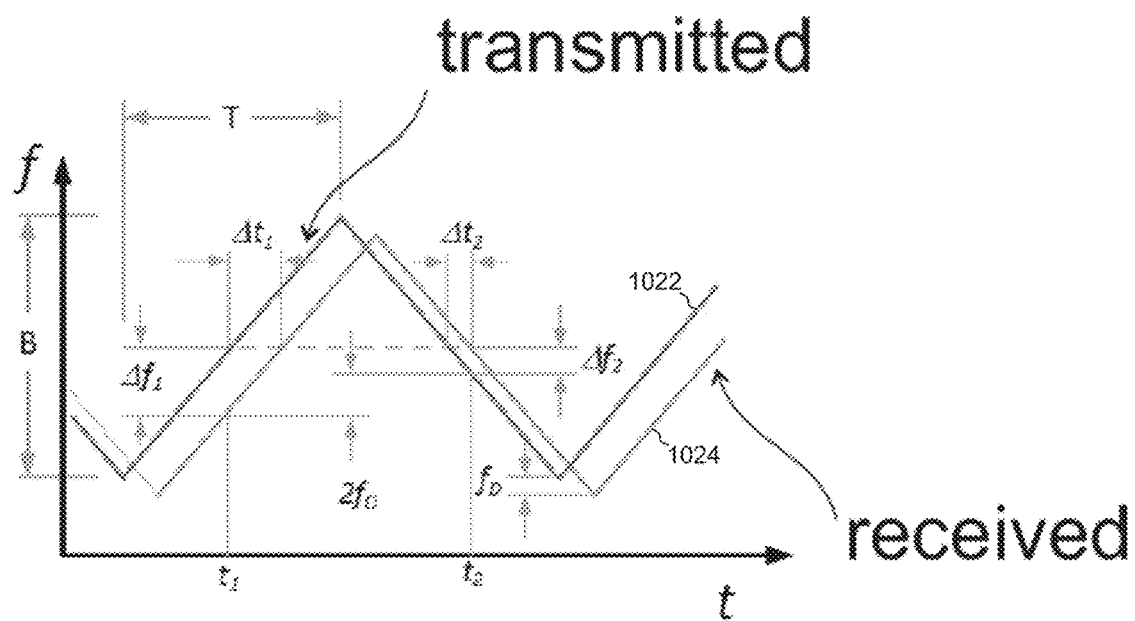
FIG. 10 illustrates signals which are transmitted and received by a millimeter wave sensor system of the apparatus according to an embodiment.

FIG. 10 illustrates signals which are transmitted and received by the radar system 30 according to an embodiment in operation, and which are processed to detect the persons 50 in the coverage area 80.

FIG. 10 illustrates a waveform diagram of an FMCW system. Signal 1022 represents the frequency of the radar signal transmitted by a transmitter of the FMCW system, signal 1024 represents the frequency of the signal reflected by a detected target. The delay from the transmission of the transmit signal to the receipt of the signal reflected by the target is $\Delta t_2$ at time $t_1$. Time delay $\Delta t_1$ causes a frequency offset $\Delta f_1$ between the transmitted signal 1022 and the received signal 1024. Assuming that the target moves closer to the radar sensor at time $t_2$, the delay from the transmission of the transmit signal to the receipt of the signal reflected by the target is $\Delta t_2$, which corresponds to a frequency offset $\Delta f_2$ between the transmitted signal 1022 and the received signal 1024. Because the target is closer to the radar sensor at time $t_2$ than at time $t_1$, the corresponding time delay $\Delta t_1$ and frequency offset $\Delta f_2$ for the target at time $t_2$ are less than the corresponding time delay $\Delta t_2$ and frequency offset $\Delta f_1$ for the target at time $t_1$.

In various embodiments, the transmitted signal is mixed with the received signal to create an intermediate frequency signal that represents the difference in frequency between the transmitted signal and the received signal. As shown, the bandwidth B of the FMCW radar system is related to the difference between the maximum and minimum transmitted signal.

Figure 11:
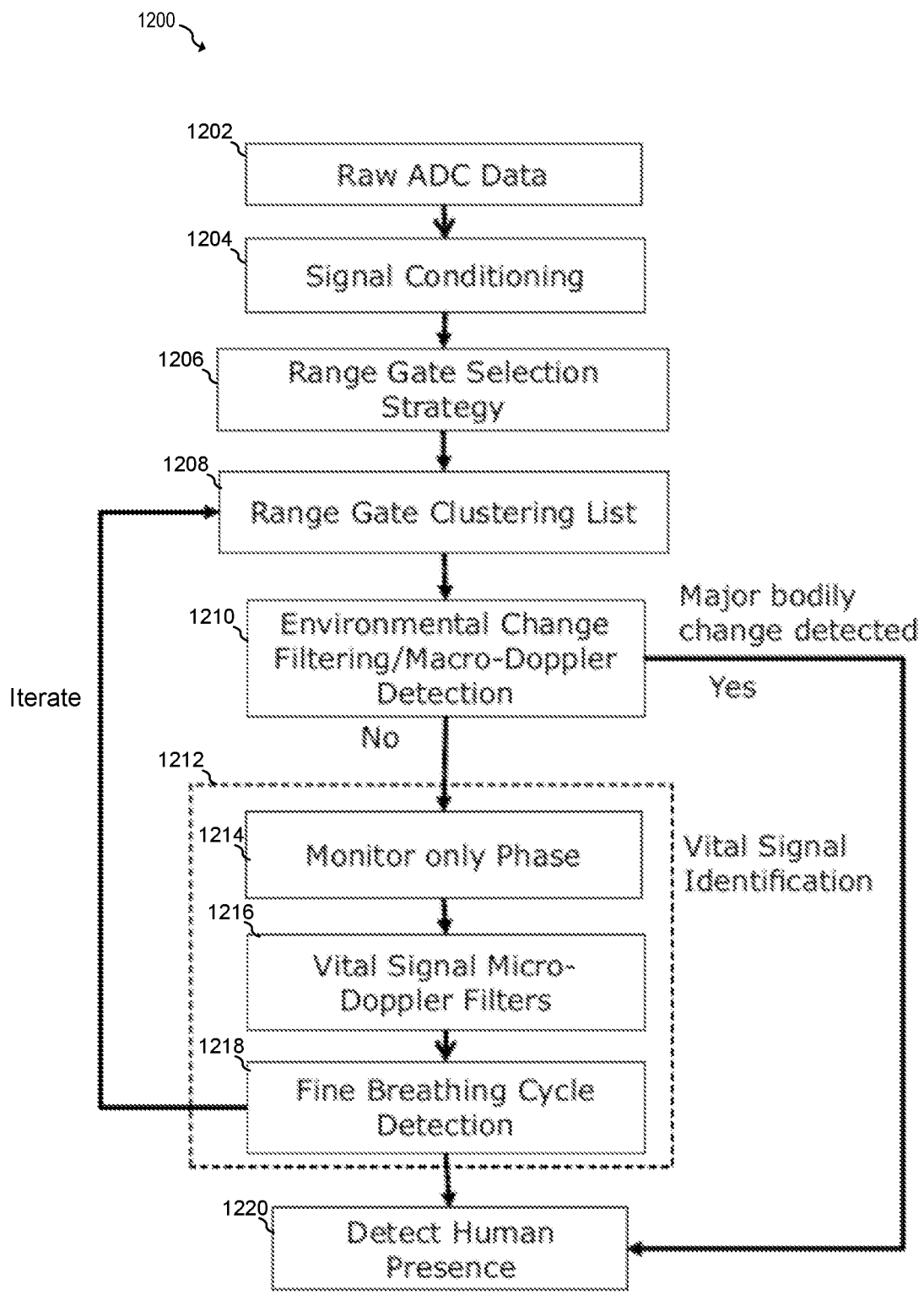
FIGS. 11 to 13 illustrate processing steps used in a method according to an embodiment.

FIG. 11 illustrates an example of an algorithm 1200 that can be applied to the sensor data generated by the radar system 30 in embodiments of the present invention.

Advantageously, the apparatus 10 is configured to implement at least one of a Macro-Doppler processing operation to the sensor data of the radar system 30 for detecting movements of a person and a Micro-Doppler processing operation to these data for detecting vital signs of a person.

At least one of these, for instance the Micro-Doppler processing operation is performed to detect passive humans, i.e. humans that are not moving in space deliberately, for instance humans who are sitting, standing still, lying e.g. for sleeping, etc.

The details of the operations of algorithm 1200 are as follows. In step 1202 raw digital data is obtained by an analog to digital conversion of the sensor data. This step may be accomplished, for example using an analog to digital converter known in the art. In step 1204, the obtained signal is conditioned using, for example, a known process. For instance, in once embodiment the obtained signal is filtered, DC components are removed, and the IF data is cleared. In some embodiments, IF data is cleared by filtering to remove the transmit-receive self-interference and optionally pre-filtering the interference colored noise. In some embodiments, filtering includes removing data outliers that have significantly different values from other neighboring range-gate measurements. In a specific example, a Hampel filter is applied with a sliding window at each range-gate to remove such outliers. Alternatively, other filtering for range preprocessing known in the art may be used.

In step 1206, range-gates are selected, e.g. by selecting range-gates whose mean is greater than the mean of all the other range gates in the field-of-view as potential target range-gates, wherein in some embodiments a range FFT is taken of the conditioned radar data. In an embodiment, a windowed FFT having a length of a chirp may be calculated along each waveform. Each point of the range FFT may represent a distance between a millimeter-wave sensor and a detected object and corresponds to a range gate. In some embodiments, a range FFT is performed for radar data produced by each receive antenna in a receive antenna array. In various embodiments, the range-gate selection also determines the angle or azimuth of detected targets with respect to a millimeter-wave radar sensor as well as their range or distance to the millimeter-wave radar sensor.

In step 1208, range clustering is performed, for example, regrouping ranges together, e.g. through a nearest neighbor clustering operation. In step 1210, Macro-Doppler detection is used to detect movements of a person, e.g. through a Doppler Fast Fourier Transform and thresholding performed over selected range gates. In an embodiment, in the threshold-based approach the short-time energy of the moving variance of the range-gate is examined. This variance energy may be empirically calculated in some embodiments. Range-gate measurements that fall below the threshold established by the short-time energy of the moving variance of the range-gate are considered to be representative of static objects, while range-gate measurements that are above the threshold are considered to be representative of moving objects or environmental changes.

Vital signal identification is performed in step 1212, e.g. through a Micro-Doppler process using one or more low bandwidth filter to extract heart-beat signal and/or breathing signal from the selected range gates if no movement is detected in the Macro Doppler detection. This allows the filtering out of static inanimate targets with high radar cross section (RCS), as they would produce no vital signals/noise after passing through these filters, contrary to humans. In an embodiment, two fixed, calibrated low bandwidth filters are employed to extract a heart-beat signal and a breathing signal from the selected range gates. For example, a band-pass filter centered around 0.4 Hz with a bandwidth of 0.5 Hz can be used. Alternatively other center frequencies and bandwidths may be used. In some embodiments, vital signal identification 1212 includes substep 1214 in which only monitoring is performed. Next in substep 1218, the vital signal Micro-Doppler filters as describe above are applied to signals monitored during step 1214. Lastly, in substep 1218, the breathing signal is detected. Alternatively, vital signal detection may occur using different steps. In some embodiments, vital signal processing methods may be used that are disclosed in U.S. patent application Ser. No. 15/872,677, filed Jan. 16, 2018, now U.S. Pat. No. 11,346,936 which has been incorporated by reference in its entirety.

The steps starting from the range clustering 1208 are then for instance iterated over time to track changes of the direction of the person relative to the apparatus.

Appropriate filtering, for instance through thresholding of the obtained elevation or of an obtained heart beat/breathing cycle, may then be applied to filter out living beings which are not humans, such as house pets and/or to distinguish between adults and children. For instance, if the estimated breathing cycle is not within a predetermined range that corresponds with a normal human respiration, for example, between about 12 breaths per minute and about 35 breaths per minute, then it may be determined that the target is not human. As a further example, if the estimated heart rate is not within a predetermined range that corresponds with a normal heart rate, for example, between about 50 beats per minute and about 200 beats per minute, then it may be determined that the target is not human.

In more detail, in some embodiments, during operation, the millimeter-wave radar system 30 first performs a coarse measurement using Macro-Doppler techniques to determine the presence of moving and non-moving objects. (In some embodiments, non-vital motion is categorized using Macro-Doppler techniques.) Next, the millimeter-wave radar system 30 performs a series of more targeted measurements of the detected objects using Micro-Doppler techniques to determine whether these detected objects exhibit a heart-rate and respiration within the expected range of a human being.

In embodiments that utilize a frequency modulated continuous wave (FMCW) radar sensor, the location of each object in the facility 20 within a range-gate may be found by taking a range (fast Fourier transform) FFT of the baseband radar signal produced by a millimeter-wave radar sensor 90 of the millimeter wave radar system 30, and the motion of the various objects may be determined, for example, by taking further FFTs to determine each object's velocity using Doppler analysis techniques known in the art. In embodiments in which a millimeter-wave radar sensor 90 of the millimeter wave radar system 30 includes a receive antenna array, further FFTs may also be used to determine the azimuth of each object with respect to the respective millimeter-wave radar sensor. For example, furniture may be identified in a range-gate as being a static object, a fan may be identified in a range-gate as being a moving object, a static human may be identified in a range-gate as being a static object and a moving human may be identified in a range-gate as being a moving object.

In some embodiments a two-dimensional FFT may be taken of a range FFT over slow-time to determine the velocity of each detected object. Alternatively, the velocity of each object may be determined by other waveform techniques including, but not limited to triangular chirp and staggered pulse repetition time (PRT).

Next, Micro-Doppler techniques are used to detect small motions of each above mentioned object. These small detected motions are analyzed to determine whether these motions are indicative of the heart rate and respiration of a human being. Therein, the millimeter wave radar system 30 makes a series of radar measurements that are more specifically directed toward each object. For example, in embodiments in which a millimeter-wave radar sensor 90 of the millimeter wave radar system 30 includes a transmit antenna array, these directed measurements are performed by steering the radar beam produced by a millimeter-wave radar sensor 90 of the millimeter wave radar system 30 using phase-array radar techniques. In some embodiments, beamforming may utilize discrete prolate spheroidal sequence (DPSS) methods or other beamforming methods know in the art. Based on these more directed radar measurements, the processing module 70 determines whether each object experiences small motions consistent with human vital signs such as heart rate and respiration. For example, the aforementioned furniture and fan maybe identified as non-living objects for exhibiting no human-like vital signs, whereas the aforementioned moving human is recognized as a human object via a Macro-Doppler classifier, meaning that the motion of the moving human exhibits human-like motion. The aforementioned static human is not recognized as a moving object but exhibits human-like vital signs.

In some embodiments, the results of the Macro-Doppler filtering are input to a machine learning algorithm such as, but not limited to a random forest algorithm, adaptive boosting (AdaBoost) algorithm and/or a neural network algorithm in order to identify the type of object being detected. Similarly, the vital signals determined in Micro-Doppler sensing stage 306 may also be input to the machine learning algorithm in addition to the Macro-Doppler data to distinguish and identify objects such as moving human beings and other objects such as robots and animals. For instance, the above steps are advantageously applied to the data which are generated by FMCW sensors. Pulsed radar sensors, code modulation, non-linear frequency modulation (NLFM), or Monte Carlo forecasting of waves (MCFW) may also be employed.

Figure 12:
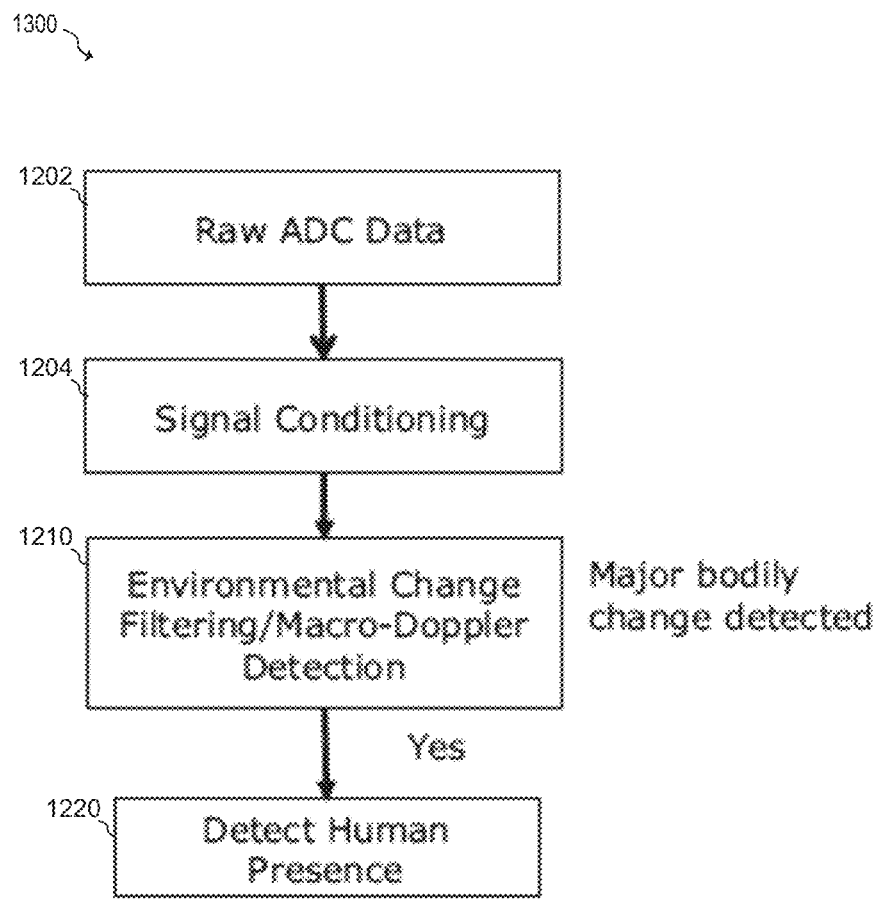

FIG. 12 illustrates an example of a further algorithm 1300 that can be applied to the sensor generated by radar system 30 in embodiments of the present invention. In some embodiments, the processing of the data may include a reduced number of steps that include obtaining the raw digital data by analog to digital conversion of the radar sensor output (step 1302), conditioning the resulting signal (step 1204), and applying a Macro-Doppler detection (step 1210) in order to detected a human presence (1220). Steps 1202, 1204, 1210 and 1220 are described above with respect to FIG. 11. Algorithm 1300 may be advantageously applied to the sensor data provided by Doppler sensors.

Figure 13:
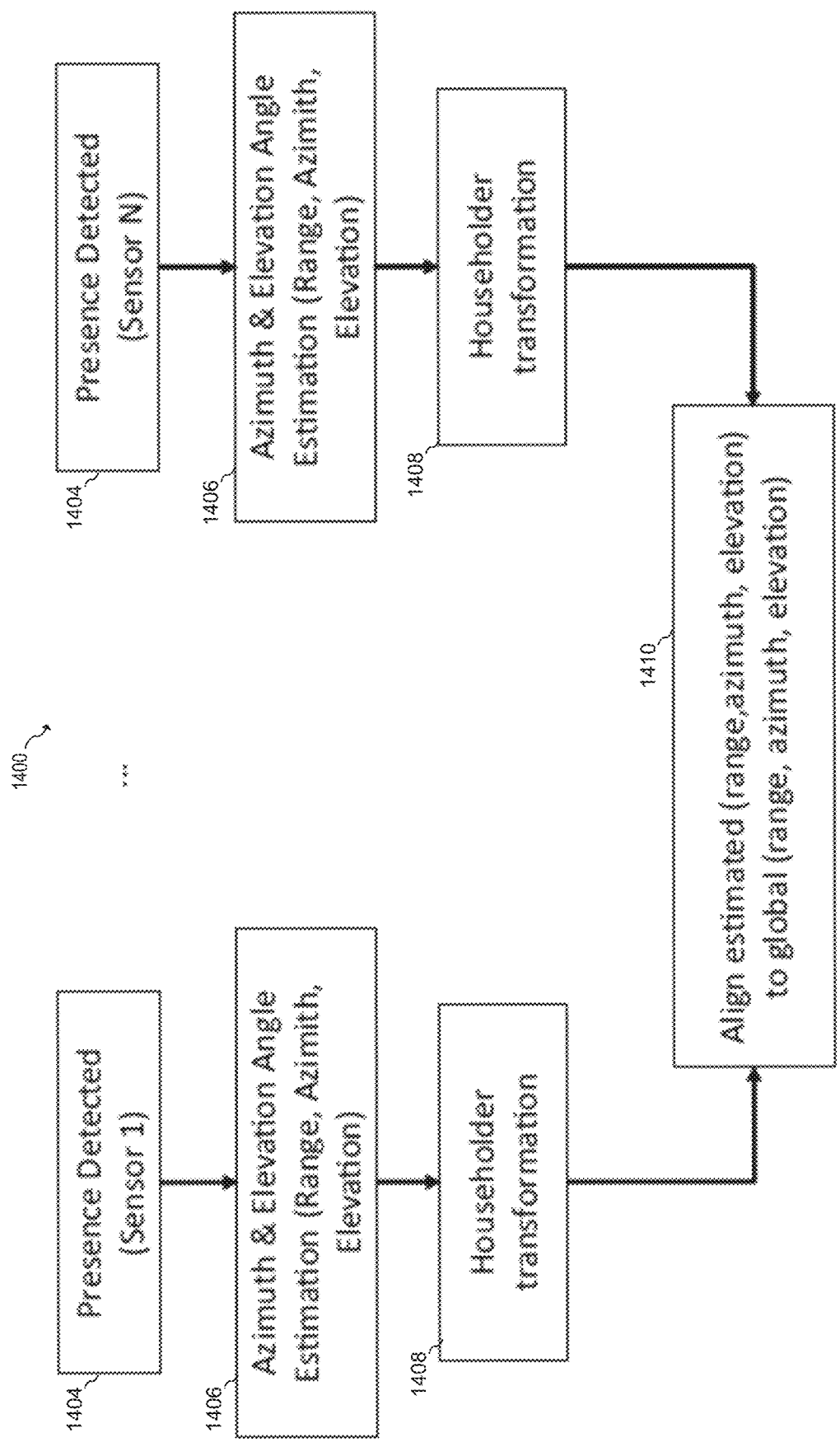

In an embodiment, further processing steps of the data may be implemented for one or more radar sensor according to method 1400 shown in FIG. 13. In step 1404, a plurality of persons 50 are detected by the radar sensor 30. Next, in step 1406, data is determined for each detected person 50, in a particular azimuth, elevation and range (e.g. distance). A Householder transformation is then applied to the azimuth, elevation and range in step 1408. Next, the results of the Householder transformation for each sensor is aligned in step 1410 so as to transpose the obtained result in a referential made common for all the subsystems in step 1408.

These operations may be implemented for the output data provided by a given sensor regardless of whether several persons are detected, for instance so as to provide the information based on which the microphone system 40 will steer the audio beams 100 in a chosen referential.

A method according to an embodiment will now be described in reference to the Figures.

In a general configuration, a method includes:
  using the radar system 30, detecting one (or more) person 50 so as to obtain a direction of the person relative to the apparatus,
  using the microphone system 40, steering at least one audio beam 100 as a function at least of the direction so as to enhance the detection by the microphone of audio inputs generated by the detected person 50 and received by the microphone system via the generated audio beam, and receiving audio inputs generated by the person via the steered audio beam.

Advantageously, when only the direction of the person(s) is used for audio beam steering, the method includes:

using the radar system 30, detecting the location of the body of one or more person 50 regardless of whether the person is performing a predetermined gesture configured to trigger a predetermined response from the apparatus, whereby the detected location of the body of the person defines a direction of the person relative to the apparatus, using the microphone system 40 configured to generate one or more audio beam 100 via each of which the microphone system is configured to receive audio inputs, generating at least one audio beam 100 as a function at least of said direction so as to steer said at least one audio beam 100 in said direction and enhance detection of audio inputs generated by the detected person 50 and received by the microphone system via the generated audio beam, and receiving audio inputs generated by the person via the generated audio beam.

Advantageously, when both the direction and distance of the person(s) is used for the operations of the microphone system 40, the method includes:

using the radar system 30, detecting a person 50, this detection providing at least a direction of the person relative to the apparatus and a distance of the person relative to the apparatus, using a microphone system configured to generate one or more audio beam via each of which the microphone system is configured to receive audio inputs, generating at least one audio beam as a function at least of said direction and said distance of the person relative to the apparatus so as to enhance detection of audio inputs generated by the detected person and received by the microphone system via the generated audio beam, and receiving audio inputs generated by the person via the generated audio beam.

The various modalities and functionalities of the radar system 30, the microphone system 40 and processing module 70 discussed above may then be implemented whether separately or in combination according to any possible technically compatible combination regardless of the specific method applied.

In particular, advantageously, the process implements the principle of only steering an audio beam in the direction of the detected person (and possibly generating the beam also as a function of the distance between the apparatus and the person) only the distance between the person and the apparatus obeys a specific relationship relative to the or one threshold distance of the apparatus, for instance pertaining to the subsystem in the angular sector of which the person is detected. One or more thresholding operation of the distance provided by the radar system 30 may be performed to this end.

Advantageously, the processing of the sensor data generated by the radar system includes applying a gaussian kernel density estimation (KDE) method to take into account shadowing phenomena that may occur due to the output of a plurality of radar sensors being used.

In some embodiments, the apparatus 10 may be configured to provide one or more stimulus indicative at least of the fact that a person has been detected by the device, and preferably also of the direction of the person relative to the apparatus, e.g. of its azimuth, elevation or both.

For instance, to this end, the apparatus 10 includes visual elements such as LEDs configured to be turned on or off so as to reflect this or these facts. For instance, they are spread around a circumference of one or more surface of the apparatus, the location of the active visual elements being indicative of the direction of the person who has been detected.

The apparatus 10 may also or alternatively include one or more speakers configured to provide an audio stimulus in response to the detection of the person. This stimulus may take the form of words spoken for the attention of the detected person.

Figure 14:
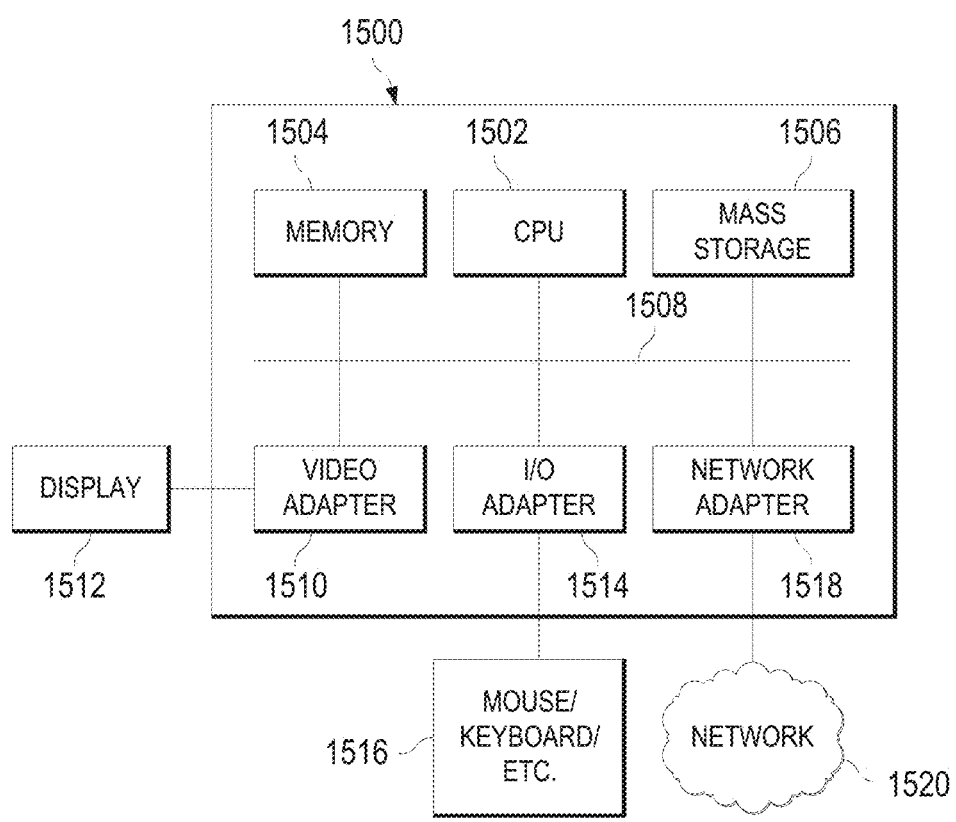
FIG. 14 illustrates a block diagram of a processing system that can be used to implement embodiment processing systems and methods.

Referring now to FIG. 14, a block diagram of a processing system 1500 is provided in accordance with an embodiment of the present invention. The processing system 1500 depicts a general-purpose platform and the general components and functionality that may be used to implement portions of the embodiment radar and audio system and/or an external computer or processing device interfaced to the embodiment radar and audio system. The processing system 1500 may include, for example, a central processing unit (CPU) 1502, memory 1504, and a mass storage device 1506 connected to a bus 1508 configured to perform the processes discussed above. The processing system 1500 may further include, if desired or needed, a video adapter 1510 to provide connectivity to a local display 912 and an input-output (I/O) Adapter 1514 to provide an input/output interface for one or more input/output devices 1516, such as a mouse, a keyboard, printer, tape drive, CD drive, or the like. In various embodiments, CPU 1502 executes instructions in an executable program stored, for example in a non-transitory computer readable storage medium, such as a memory 1504 to perform the various functions of embodiment systems.

The processing system 900 also includes a network interface 1518, which may be implemented using a network adaptor configured to be coupled to a wired link, such as an Ethernet cable, USB interface, or the like, and/or a wireless/cellular link for communications with a network 1520. The network interface 1518 may also comprise a suitable receiver and transmitter for wireless communications. It should be noted that the processing system 1500 may include other components. For example, the processing system 1500 may include power supplies, cables, a motherboard, removable storage media, cases, and the like. These other components, although not shown, are considered part of the processing system 1500.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An apparatus comprising:
   a millimeter wave radar sensor system configured to detect a location of a body of a person regardless of whether the person is performing a predetermined gesture forming a command for triggering a predetermined response from the apparatus, wherein the detected location of the body of the person defines a direction of the person relative to the apparatus; and
   a microphone system configured to form one or more audio beams via each of which the microphone system is configured to receive audio inputs, the microphone system being configured to form at least one audio beam of the one or more audio beams as a function at least of said direction so as to steer said at least one audio beam in said direction and enhance detection of audio inputs generated by the person and received by the microphone system via the at least one audio beam formed by the microphone system.

2. The apparatus of claim 1, wherein:
the millimeter wave radar sensor system is configured to have a predetermined angular coverage around the apparatus; and
the millimeter wave radar sensor system is adapted to vary the angular coverage dynamically.

3. The apparatus of claim 2, wherein for varying the angular coverage dynamically, the millimeter wave radar sensor system is configured to selectively activate and deactivate each millimeter wave radar sensor subsystem.

4. The apparatus of claim 2, wherein for varying the angular coverage dynamically, the apparatus is configured to selectively include or not include sensor output data respectively generated by each millimeter wave radar sensor subsystem during a processing of sensor output data generated by the millimeter wave radar sensor system.

5. The apparatus of claim 1, wherein for detecting the location of the body of the person, the apparatus is configured to implement at least one of a Macro-Doppler processing operation for detecting movements of the person and a Micro-Doppler processing operation for detecting vital signs of the person.

6. The apparatus of claim 1, wherein the microphone system is configured to adjust over time the configuration of the at least one audio beam via which audio inputs generated by the person are received as a function of changes of at least the direction of the person relative to the apparatus detected by the millimeter wave radar sensor system.

7. The apparatus of claim 1, wherein the millimeter wave radar sensor system is configured to simultaneously detect respective locations of the bodies of a plurality of persons regardless of whether one or more person is performing the predetermined gesture forming the command for triggering the predetermined response from the apparatus, wherein the detected locations of the bodies of the person define respective directions of the persons relative to the apparatus, and
wherein the microphone system is configured to form, for each of said persons, a corresponding audio beam of the one or more audio beams as a function at least of the corresponding direction so as to enhance reception of audio inputs generated by the corresponding person and received by the microphone system via the corresponding audio beam formed by the microphone system.

8. The apparatus of claim 7, wherein the millimeter wave radar sensor system is configured to detect a distance of the person relative to the apparatus; and
wherein the millimeter wave radar sensor system has a maximum detection range, and wherein the microphone system is configured to form the at least one audio beam for the person as a function of at least the direction of the person relative to the apparatus only when the detected distance of the person relative to the apparatus satisfies a predetermined criterion relative to a predetermined threshold distance that is less than the maximum detection range.

9. The apparatus of claim 8, wherein each millimeter wave radar sensor subsystem has a predetermined threshold distance associated thereto, and, for a person detected in an angular sector of a given millimeter wave radar sensor subsystem, the microphone system is configured to form the at least one audio beam for the person as the function at least of the direction of the person relative to the apparatus only when the distance of the person relative to the apparatus satisfies a predetermined criterion relative to the threshold distance associated to the corresponding millimeter wave radar sensor subsystem.

10. The apparatus of claim 9, wherein the respective threshold distances of at least two millimeter wave radar sensor subsystems are different.

11. The apparatus of claim 9, wherein:
for a first millimeter wave radar sensor subsystem, the microphone system is configured to form the at least one audio beam for a person detected in an angular sector of the first millimeter wave radar sensor subsystem as a function of the direction of the person relative to the apparatus only when the distance of the person relative to the apparatus is greater than or equal to the predetermined threshold distance associated to the first millimeter wave radar sensor subsystem; and
for a second millimeter wave radar sensor subsystem, the microphone system is configured to form the at least one audio beam for the person detected in the angular sector of the first millimeter wave radar sensor subsystem as the function of the direction of the person relative to the apparatus only when the distance of the person relative to the apparatus is less than or equal to the predetermined threshold distance associated to the second millimeter wave radar sensor subsystem.

12. The apparatus of claim 8, wherein the apparatus is configured to vary the threshold distance as a function of a usage history of the apparatus which includes data indicative of distances between the apparatus and persons at times at which the persons issued at least one command to the apparatus.

13. The apparatus of claim 8, wherein the microphone system is configured to form the at least one audio beam for the person only when the detected distance of the person relative to the apparatus is greater or equal to the predetermined threshold distance.

14. The apparatus of claim 8, wherein the microphone system is configured to form the at least one audio beam for the person only when the detected distance of the person relative to the apparatus is less than or equal to the predetermined threshold distance.

15. The apparatus of claim 7:
wherein the millimeter wave radar sensor system is configured to detect a distance of the person relative to the apparatus; and
wherein the millimeter wave radar sensor system has a maximum detection range, and wherein the microphone system is configured to form the at least one audio beam for the person as a function of at least the direction of the person relative to the apparatus only when the detected distance of the person relative to the apparatus is greater than or equal to a predetermined threshold distance that is less than the maximum detection range.

16. The apparatus of claim 1, wherein the apparatus is configured to perform a noise cancellation operation to enhance the detection of the audio inputs generated by the person.

17. The apparatus of claim 1, wherein the millimeter wave radar sensor system is configured to detect a size of the person, and the apparatus is configured so that the at least one audio beam for the person is only formed by the microphone system when the size of the person is greater or equal than a predetermined threshold size.

18. An apparatus comprising:
a millimeter wave radar sensor system configured to detect a person, so as to obtain a direction of the person relative to the apparatus and a distance of the person relative to the apparatus; and
a microphone system configured to form one or more audio beams via each of which the microphone system is configured to receive audio inputs, the microphone system being configured to form at least one audio beam of the one or more audio beams as a function at least of said direction and said distance of the person relative to the apparatus so as to enhance detection of audio inputs generated by the detected person and received by the microphone system via the at least one audio beam formed by the microphone system.

19. The apparatus of claim 18, wherein the millimeter wave radar sensor system has a maximum detection range, and wherein the microphone system is configured to form the at least one audio beam for the person as the function of at least the direction and the distance of the person relative to the apparatus only when the detected distance of the person relative to the apparatus verifies a predetermined criterion relative to a predetermined threshold distance less than the maximum detection range.

20. The apparatus of claim 19, wherein the maximum detection range is defined as a minimum value among a plurality of possible maximum detection ranges of the millimeter wave radar sensor system.

21. The apparatus of claim 19, wherein the microphone system is configured to form the at least one audio beam for the person only when the detected distance of the person relative to the apparatus is greater or equal to the predetermined threshold distance.

22. The apparatus of claim 19, wherein the microphone system is configured to form the at least one audio beam for the person only when the detected distance of the person relative to the apparatus is less than or equal to the predetermined threshold distance.

23. The apparatus of claim 18, wherein the millimeter wave radar sensor system is configured to have a predetermined angular coverage around the apparatus, and wherein the millimeter wave radar sensor includes a plurality of millimeter wave radar sensor sub-systems each configured to cover an angular sector of the angular coverage so as to jointly cover the entire angular coverage; and
wherein each millimeter wave radar sensor subsystem has a predetermined threshold distance associated thereto, and, for a person detected in the angular sector of a given millimeter wave radar sensor subsystem, the microphone system is configured to form the at least one audio beam for the person as the function at least of the direction and distance of the person relative to the apparatus only when the distance of the person relative to the apparatus satisfies a predetermine criterion relative to the threshold distance associated to the corresponding millimeter wave radar sensor subsystem.

24. The apparatus of claim 23, wherein the respective threshold distances of at least two millimeter wave radar sensor subsystems are different.

25. The apparatus of claim 23, wherein the millimeter wave radar sensor system has, for each millimeter wave radar sensor subsystem, a respective maximum detection range, and wherein each predetermined threshold distance is less than the maximum detection range of the corresponding millimeter wave radar sensor subsystem.

26. The apparatus of claim 23, wherein:
for a first millimeter wave radar sensor subsystem, the microphone system is configured to form the at least one audio beam for a person detected in the angular sector of the first millimeter wave radar sensor subsystem as the function of the direction of the person relative to the apparatus only when the distance of the person relative to the apparatus is greater than or equal to the predetermined threshold distance associated to the first millimeter wave radar sensor subsystem; and
for a second millimeter wave radar sensor subsystem, the microphone system is configured to form the at least one audio beam for the person detected in the angular sector of the first millimeter wave radar sensor subsystem as a function of the direction of the person relative to the apparatus only when the distance of the person relative to the apparatus is less than or equal to the predetermined threshold distance associated to the second millimeter wave radar sensor subsystem.

27. The apparatus of claim 18, wherein the apparatus is configured to generate a stimulus destined to the person and indicative of the detection of the person by the apparatus.

28. A method comprising:
using a millimeter wave radar sensor system, detecting a person so as to obtain a direction of the person relative to an apparatus and a distance of the person relative to the apparatus;
using a microphone system configured to form one or more audio beams via each of which the microphone system is configured to receive audio inputs, forming at least one audio beam of the one or more audio beams as a function at least of said direction and said distance of the person relative to the apparatus so as to enhance detection of audio inputs generated by the detected person and received by the microphone system via the at least one audio beam formed by the microphone system; and
receiving audio inputs generated by the person via the at least one audio beam formed by the microphone system.

29. The method of claim 28, wherein the millimeter wave radar sensor system has a maximum detection range, and wherein the at least one audio beam is formed for the person as the function of at least the direction and the distance of the person relative to the apparatus only when the detected distance of the person relative to the apparatus is less than or equal to a predetermined threshold distance that is less than the maximum detection range.

* * * * *